United States Patent [19]

Sato

[11] Patent Number: 4,949,188

[45] Date of Patent: Aug. 14, 1990

[54] IMAGE PROCESSING APPARATUS

[75] Inventor: Yuichi Sato, Yokohama, Japan

[73] Assignee: Canon Kabushiki Kaisha, Tokyo, Japan

[21] Appl. No.: 296,593

[22] Filed: Jan. 13, 1989

[30] Foreign Application Priority Data

Jan. 19, 1988 [JP] Japan ................... 63-010133

[51] Int. Cl.⁵ .............................. H04N 1/40
[52] U.S. Cl. .................... 358/448; 358/452; 358/453; 358/462
[58] Field of Search ............... 358/448, 452, 453, 462

[56] References Cited

U.S. PATENT DOCUMENTS 4,587,633 5/1986 Wang et al. .................... 358/256

Primary Examiner—Edward L. Coles, Sr.
Attorney, Agent, or Firm—Fitzpatrick, Cella, Harper & Scinto

[57] ABSTRACT

An image processing apparatus includes an image reading device for outputting image data, a RAM for generating a page description language representing a character, a graphic pattern, and the like, the page description language including a command which represents the image reading device, an interpreter for interpreting the page description language from the RAM, and a mapping driver for synthesizing image data from the image reading device and character data from the interpreter. The interpreter supplies the image data from the image reading device to the mapping driver in accordance with an interpretation of the command.

9 Claims, 4 Drawing Sheets

IMAGE PROCESSING APPARATUS

BACKGROUND OF THE INVENTION:

1. Field of the Invention

The present invention relates to an image processing apparatus for electrically processing an image and, more particularly, to an image synthesizing apparatus for synthesizing an image and code data described by a PDL (Page Description Language) to form a composite image.

2. Related Background Art

A conventional apparatus capable of synthesizing an image is an image processing system using a computer. An image read by an image reading device such as a drum scanner is temporarily stored in a large-capacity memory medium such as a magnetic disk, and compressed information is displayed on a display. After characters, graphic patterns, and the like are synthesized, a composite image is printed on a film or paper at an image output device such as a drum scanner. An interpreter for a such as Post Script available from Adobe Systems Inc. can be mounted in the above apparatus. In addition, an image can be generated from code data.

In a conventional printing image processing system, an input/output device is a bulky and expensive drum scanner, and a memory medium such as a large-capacity disk is required.

When an image such as an illustration or a photograph is synthesized with a character string represented by the page description language, and the composite image is reproduced, the density of the image is represented by numerical data, and the numerical data must be programmed as a PDL program. These operations are time-consuming, and numerical data representing the image is large in volume. As a result, the PDL program becomes very long, and its processing time is undesirably prolonged.

A volume of data of a halftone image or a full-color image is large. This image is not suitable to be expressed by numerical data.

SUMMARY OF THE INVENTION:

The present invention has been made in consideration of the above situation, and has as its object to provide an image processing apparatus capable of efficiently synthesizing a character and an original image.

It is another object of the present invention to provide an image processing apparatus capable of easily synthesizing a character or graphic pattern represented by the page description language and an original image.

In order to achieve the above objects of the present invention, there is provided an image processing apparatus comprising:

output means for outputting image data;

means for generating a page description language including a command which represents the output means and representing a character, a graphic pattern, and the like;

interpreter means for interpreting the page description language from the generating means; and synthesizing means for synthesizing image data from the output means and character data from the interpreter means, wherein the interpreter means supplies the image data from the output means to the synthesizing means in accordance with an interpretation of the command.

The above and other objects, features, and advantages of the present invention will be apparent from the following detailed description in conjunction with the accompanying drawings.

DESCRIPTION OF THE PREFERRED EMBODIMENT

Figure 1:
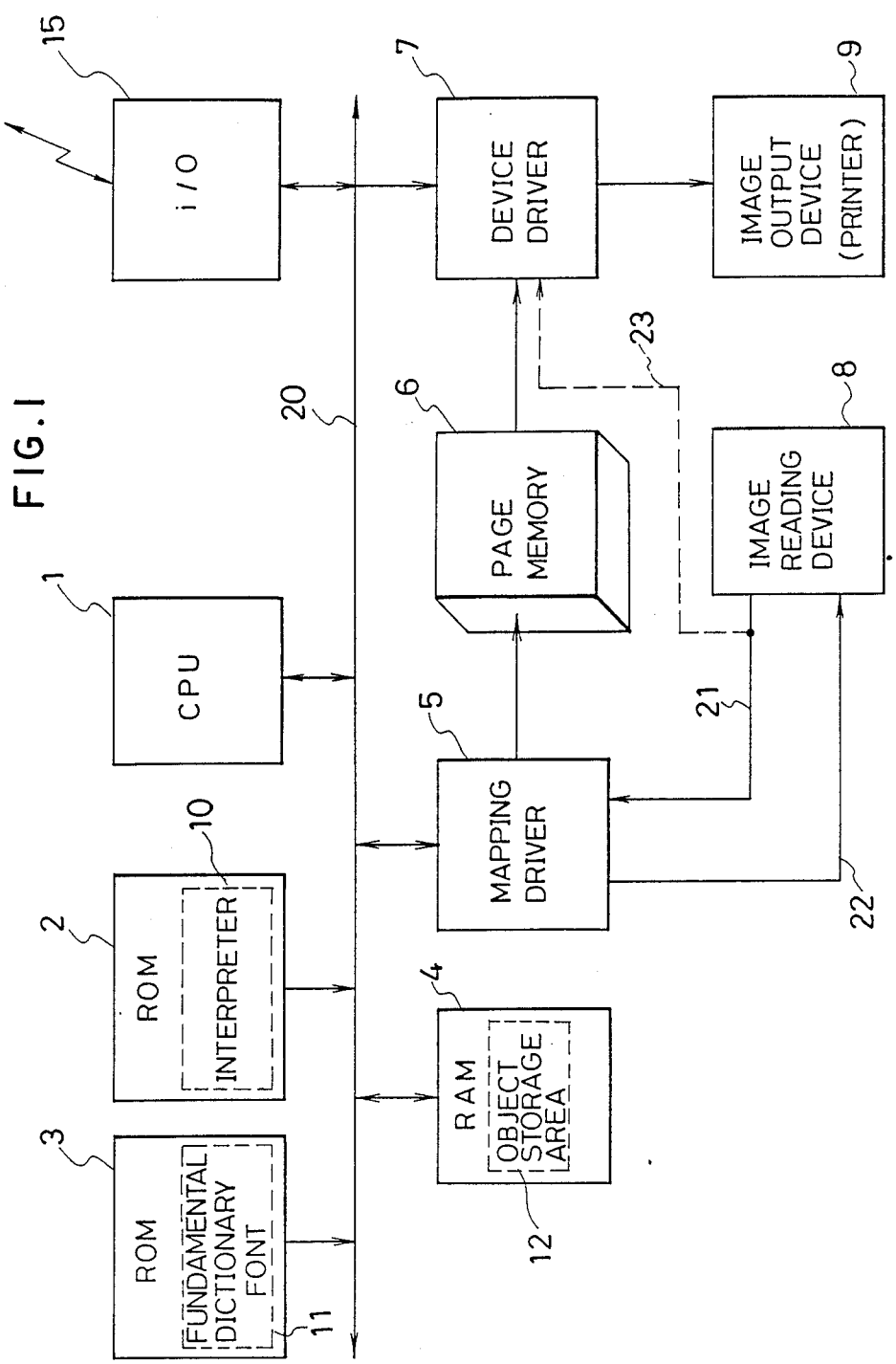
FIG. 1 is a block diagram showing an arrangement of an image synthesizing apparatus according to an embodiment of the present invention.

FIG. 1 is a block diagram showing an arrangement of an image synthesizing apparatus according to an embodiment of the present invention. In this embodiment, Post Script available from Adobe Systems Inc. is exemplified as a PDL. Please refer to Adobe System, Post Script Language—Tutorial and Cook Book, Addison Welsley, 1985 for this Post Script.

Referring to FIG. 1, a CPU 1 controls an overall operation of the apparatus. A program ROM 2 includes an interpreter 10 for a page description language (PDL) program. A ROM 3 includes a PDL fundamental dictionary/font ROM area 11. A RAM 4 includes a storage area 12 of a PDL object. A mapping driver 5 develops graphic data, character data, binary image data, and multivalue image data read by an image reading device 8 into a page memory 6 on the basis of a PDL object. The mapping driver 5 controls the image reading device 8. A page memory 6 can store at least one-frame multivalue image data. A device driver 7 outputs the image data developed in the page memory 6 to an image output device 9. The image reading device 8 reads a multivalue image from a light-reflecting or light-transmitting original by using a CCD image sensor or the like. The image output device 9 such as a laser beam printer records a multivalue image on a recording medium on the basis of input image data. The CPU 1, the ROMs 2 and 3, the RAM 4, the mapping driver 5, the page memory 6, the device driver 7, and an I/O interface 15 are connected to each other through a CPU bus 20. The image reading device 8 is connected to the mapping driver 5, and the image output device 9 is connected to the device driver 7. A multivalue image data output from the image reading device 8 is input to the mapping driver 5 through a signal line 21, and a control signal from the mapping driver 5 is input to the image reading device 8 through a control line 22. A dotted line 23 represents a data flow in which image data from the image reading device 8 is directly supplied to the image output device 9 to simply copy an original image.

With the above arrangement, an image read by the image reading device 8 by using the page description language is dealt as a kind of font or the like. The image data is not directly described but is described as a name of an image input device or image. When the page description language program is developed into an image by using an interpreter capable of interpreting and processing the page description language, image data is input from an external image input device such as an image file or the image reading device 8 serving as a copying machine reader unit, and code data represented by the page description language is synthesized with image data.

Figure 2:
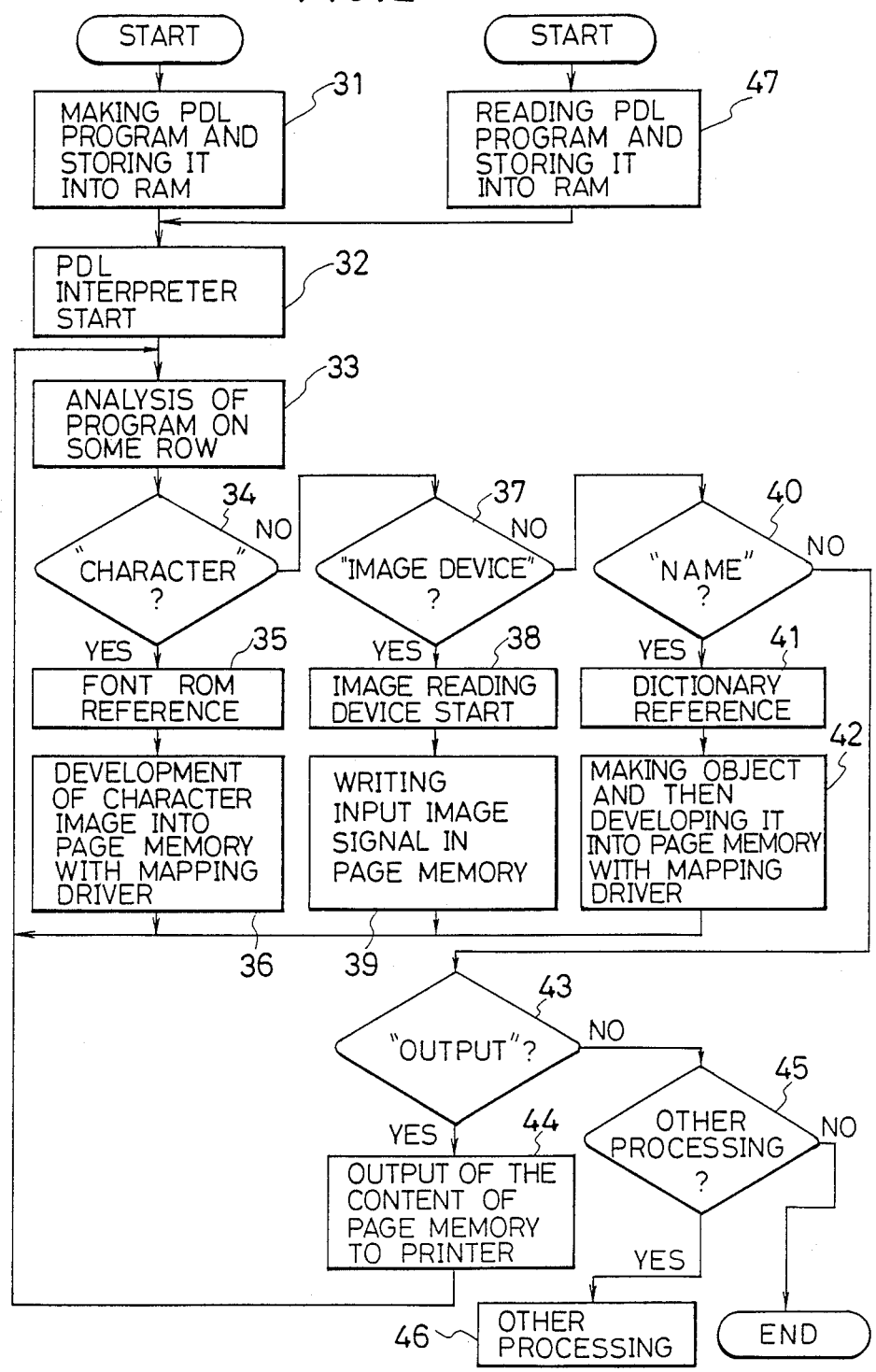
FIG. 2 is a flowchart for explaining an operation of the apparatus shown in FIG. 1.

FIG. 2 is a flowchart showing operation procedures of the image synthesizing apparatus shown in FIG. 1.

With the above arrangement, a PDL program generated by a PDL programming means (not shown) including the CPU 1, or a PDL program input from an external device such as a host computer through the I/O interface 15 is stored in the RAM 4 (steps 31 and 47).

The interpreter 10 for interpreting and executing the PDL program stored in the RAM 4 is started (step 32).

The interpreter 10 interprets PDL program contents sequentially read out from the RAM 4 (step 33). If the content represents a "character" (step 34), the font ROM 11 stored in the ROM 3 is referred to (step 35). The mapping driver 5 is controlled to develop a character image in the page memory 6 (step 36).

However, if the content represents a "name" (step 40), the fundamental dictionary stored in the ROM 3 or the extended dictionary prestored in the RAM 4 is accessed (step 41) to make an object. The object is developed into the page memory 6 by the mapping driver 5 (step 42).

When an "image device" as a description such as a name of the image reading device 8 or an image read by the image reading device 8 is present in the program (step 37), the interpreter 10 causes the mapping driver 5 to start the image reading device 8 (step 38) and outputs an image write command.

The mapping driver 5 writes the image data read by the image reading device 8 in the page memory 6 on the basis of information such as an image write area (step 9), and a composite image of the character image and the original image is generated in the page memory 6.

Upon formation of the composite image in the page memory 6, when an image output command is output from the PDL program (step 43), the interpreter 10 interprets the image output command. The interpreter 10 causes the device driver 7 to output the composite image. The device driver 7 outputs the content of the page memory 6 to the image output device 9, thereby obtaining a composite image (step 44).

In order to simply copy a multivalue image, image data from the image reading device 8 is output to the image output device 9 through the device driver 7, as indicated by the dotted line 23, thereby performing high-speed copying.

A composite image of character data and original image data will be described with reference to FIGS. 4(A) to 4(C).

Figure 4A:
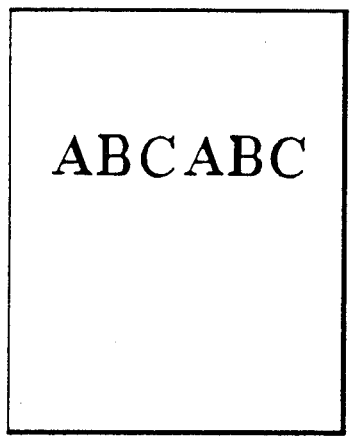
FIGS. 4(A) to 4(C) are views showing character-image synthesis results, respectively.
Figure 4B:
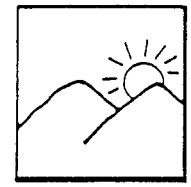
Figure 4C:
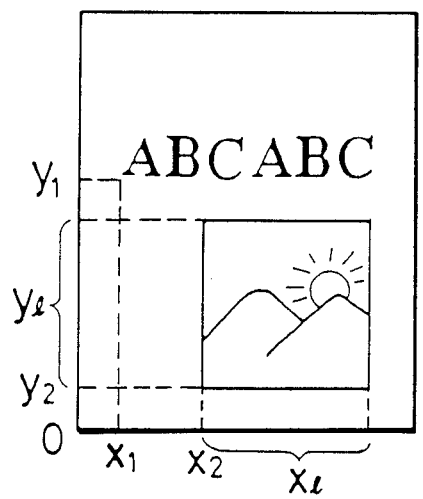

More specifically, a character string ABCABC of 64-point Times-Roman font shown in FIG. 4(A) is synthesized with original image shown in FIG. 4(B), thereby obtaining a composite image shown in FIG. 4(C). Coordinate data $(x_1,y_1)$ in FIG. 4(C) represents a position of the character string; $(x_2,y_2)$, a position of the original image; and (xl,yl), an area size of the original image. It should be noted that in the Post Script, these coordinate values and length are expressed in units of points each corresponding to 1/72 inch. Therefore, a coordinate value or length corresponding to one inch is expressed as 72 points.

A PDL program for obtaining the composite image shown in FIG. 4(C) can be given as follows:

---
/Times-Roman findfont 64 scalefont setfont
$x_1y_1$ moveto
(ABCABC) show
$x_2y_2$xlyl rect reader picture
showpage
---

In the above program, the first line represents the "name" and its content is that "the Times-Roman font is searched from the Font Dictionary, and a character size represented by the found font is defined as 64 points".

The second and third lines are associated with a "character", their contents are that "the start point of the character string is defined as a coordinate position $(x_1,y_1)$ from the origin, and the character string $\mp$AB-CABC" is written at the defined position."

The fourth line is associated with an "image device" and its content is that "the original image from the image reading device is reproduced in a rectangular area having an x-direction length xl and a y-direction length yl from a coordinate position $(x_1,y_1)$ defined with reference to the origin."

The fifth line represents an instruction for outputting the composite image.

The above problem is an illustrative example. The "image device" on the fourth line and the "character" on the second and third lines may be reversed in order due to the nature of the Post Script. Other instruction words may be used to obtain the same program as described above.

The font type and its size are not limited to Times-Roman and 64 points. In addition, the area of the original image is not limited to the rectangular area, but can be replaced with other polygonal or circular areas.

With the foregoing arrangement the multivalue image data is described by an image attribute such as an image name or a name of the image reading device. The actual multivalue image data is written when the page description program is developed. Therefore, the multivalue image can be easily synthesized with the character image described by the page description language at high speed, and the resultant composite image can be output.

According to the above method, the page description language need not be greatly modified, and the image data itself need not be converted into program data.

Figure 3:
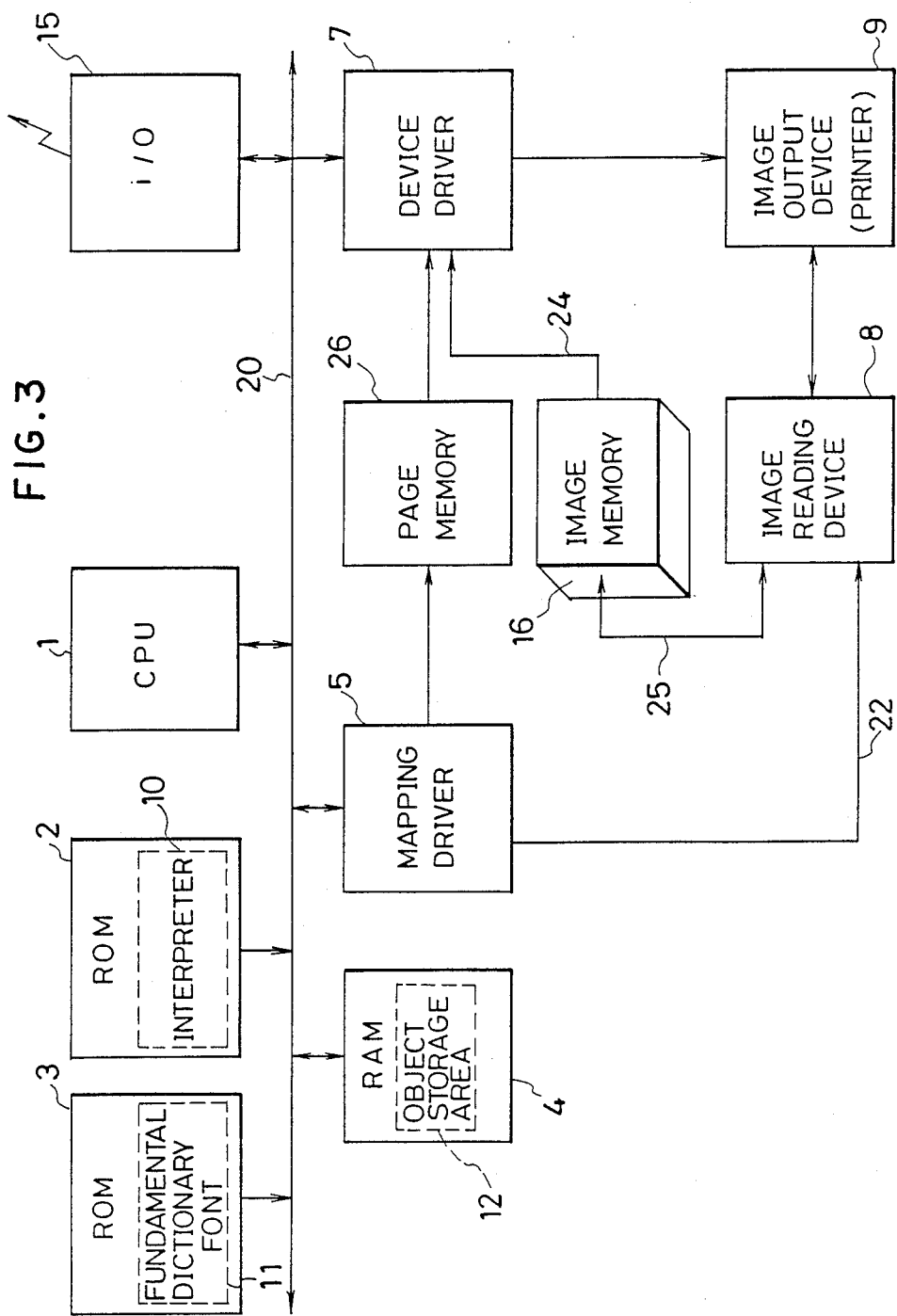
FIG. 3 is a block diagram showing an arrangement of an image synthesizing apparatus according to another object of the present invention.

FIG. 3 shows another embodiment of the present invention. The same reference numerals as in FIG. 1 denote the same parts in FIG. 3. This embodiment includes a multivalue image memory 16, multiimage data lines 24 and 25, and a binary image page memory 26.

The operation of the arrangement shown in FIG. 3 is substantially the same as that of FIG. 1. Image data read by an image reading device 8 is directly supplied to the image memory 16 without being through a mapping driver 5 and is then supplied from the image memory 16 to an image output device 9 through a device driver 7 in synchronism with an operation of the image output device 9. In this case, when the image output device 9 is started during operation of the image reading device 8, the image memory 16 need not have a one-frame capacity, thereby saving the memory capacity as compared with the embodiment shown in FIG. 1.

In the above embodiment, the character is synthesized with the image read by the image reading device.

However, the image data need not be the read image data. The present invention may be applied to synthesis of an image read out from an electronic file for storing image data and a PDL character.

The present invention has been described with reference to the preferred embodiments but is not limited thereto. Various changes and modifications may be made within the spirit and scope of the appended claims.

I claim:

1. An image processing apparatus comprising:
   output means for outputting image data representing an original image;
   means for generating a page description language including code data which represents a character, a graphic pattern, and the like, the page description language further including command data;
   interpreter means for sequentially interpreting the code data and the command data included in the page description language from said generating means, said interpreter means being operable in such a way that if the page description language is the code data, said interpreter means forms image data representing a character, a graphic pattern, and the like, and if the page description language is the command data, said interpreter means causes said output means to output image data representing the original image; and
   synthesizing means for synthesizing the image data representing a character, a graphic pattern, and the like from said interpreter means and the image data representing the original image from said output means.

2. An apparatus according to claim 1, wherein said output means comprises reading means for reading original image and outputting image data.

3. An apparatus according to claim 1, wherein said synthesizing means comprises storage means for storing the image data from said output means and the image data from said interpreter means.

4. An apparatus according to claim 1, wherein said interpreter means starts said output means in accordance with the interpretation of the command data.

5. An apparatus according to claim 1, further comprising recording means for recording an image, which is a composite image of a character, a graphic pattern, and the like and the original image, on the basis of the image data which are generated by said synthesizing means.

6. An image processing apparatus comprising:
   output means for outputting image data representing an original image;
   means for generating a page description language including code data which represents a character, a graphic pattern, and the like, the page description language further including command data which represents said output means;
   interpreter means for sequentially interpreting the code data and the command data included in the page description language from said generating means, said interpreter means being operable in such a way that if the page description language is the code data, said interpreter means forms image data representing a character, a graphic pattern, and the like, and if the page description language is the command data, said interpreter means causes said output means to output image data representing the original image; and
   storage means for storing at least one-frame data, said storage means storing the image data from said interpreter means and the image data from said output means and providing image data representing a composite of a character, a graphic pattern, and the like and the original image.

7. An apparatus according to claim 6 wherein said output means comprises reading means for reading original image and outputting image data.

8. An apparatus according to claim 6, wherein the interpreter means starts said output means in accordance with the interpretation of the command data.

9. An apparatus according to claim 6, further comprising recording means for recording an image, which is a composite image of a character, a graphic pattern, and the like and the original image, on the basis of the image data which are read out from said storage means.

* * * * *